United States Patent
Orona et al.

(10) Patent No.: US 12,270,370 B2
(45) Date of Patent: *Apr. 8, 2025

(54) ADAPTIVE CONTROL OF WAVE ENERGY CONVERTERS

(71) Applicant: Ocean Motion Technologies, Inc., San Diego, CA (US)

(72) Inventors: Alexander J. Orona, San Diego, CA (US); Boyang Pan, San Diego, CA (US); Leverett Bezanson, Alpine, CA (US); Paul Glick, Santa Cruz, CA (US); Justin Walraven, San Diego, CA (US); Mark Huang, Spring Valley, CA (US); Nathaniel Bell, Tacoma, WA (US)

(73) Assignee: Ocean Motion Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,443

(22) Filed: Mar. 20, 2024

(65) Prior Publication Data

US 2024/0254958 A1 Aug. 1, 2024

Related U.S. Application Data

(63) Continuation of application No. 18/468,615, filed on Sep. 15, 2023, now Pat. No. 11,939,945.

(Continued)

(51) Int. Cl.
*F03B 15/00* (2006.01)
*F03B 13/20* (2006.01)

(52) U.S. Cl.
CPC ............. *F03B 15/00* (2013.01); *F03B 13/20* (2013.01); *F05B 2220/706* (2013.01); *F05B 2240/93* (2013.01)

(58) Field of Classification Search
CPC .... F03B 15/00; F03B 13/20; F05B 2220/706; F05B 2240/93
See application file for complete search history.

(56) References Cited

U.S. PATENT DOCUMENTS

| 4,092,828 A | 6/1978 | Garza |
|---|---|---|
| 4,258,270 A | 3/1981 | Toernkvist |

(Continued)

FOREIGN PATENT DOCUMENTS

| CA | 2725619 C | 7/2016 |

OTHER PUBLICATIONS

International Search Report and Written Opinion mailed on Mar. 13, 2024 for International Patent Application No. PCT/US23/74404, 13 pages.

*Primary Examiner* — Viet P Nguyen
(74) *Attorney, Agent, or Firm* — Perkins Coie LLP

(57) ABSTRACT

A wave energy capture system deployed in water converts mechanical motion induced by waves in the water to electrical energy. A controller of the wave energy capture system receives input regarding real-time wave conditions in a vicinity of the wave energy capture system. The controller applies a control model to the received input to select a value of a control parameter for the wave energy capture system, where the control model includes a model that has been trained using machine learning to take wave condition data as input and to output control parameter values selected based on the wave condition data in order to increase an amount of energy captured by the wave energy capture system. The controller implements the selected value of the control parameter on the wave energy capture system.

17 Claims, 9 Drawing Sheets

Related U.S. Application Data

(60) Provisional application No. 63/383,873, filed on Nov. 15, 2022.

(56) References Cited

U.S. PATENT DOCUMENTS

| | | |
|---|---|---|
| 4,260,901 A | 4/1981 | Woodbridge |
| 4,379,235 A | 4/1983 | Trepl |
| 4,389,843 A | 6/1983 | Lamberti |
| 4,480,966 A | 11/1984 | Smith |
| 6,300,689 B1 | 10/2001 | Smalser |
| 6,812,588 B1 | 11/2004 | Zadig |
| 7,309,926 B2 | 12/2007 | Watt |
| 7,816,797 B2 | 10/2010 | Nair |
| 2002/0162326 A1 | 11/2002 | Brumfield |
| 2008/0018114 A1 | 1/2008 | Weldon |
| 2008/0150484 A1 | 6/2008 | Kimball et al. |
| 2009/0066085 A1 | 3/2009 | Gray |
| 2010/0102562 A1 | 4/2010 | Greenspan et al. |
| 2010/0213710 A1 | 8/2010 | Rhinefrank et al. |
| 2011/0042954 A1 | 2/2011 | Werjefelt |
| 2011/0068579 A1 | 3/2011 | Dullaway |
| 2011/0163547 A1 | 7/2011 | Frishberg |
| 2012/0080883 A1 | 4/2012 | Hobdy |
| 2012/0087732 A1 | 4/2012 | Gray |
| 2012/0153627 A1 | 6/2012 | Jo |
| 2013/0113215 A1 | 5/2013 | Corcoran |
| 2015/0204302 A1* | 7/2015 | Kalnay ............... F03B 13/1815 60/498 |
| 2018/0321033 A1 | 11/2018 | Tauriac |
| 2020/0049125 A1 | 2/2020 | O'Donncha et al. |
| 2021/0301778 A1 | 9/2021 | Iyer |

* cited by examiner

ADAPTIVE CONTROL OF WAVE ENERGY CONVERTERS

CROSS-REFERENCE TO RELATED APPLICATIONS

This application is a continuation of U.S. patent application Ser. No. 18/468,615, filed Sep. 15, 2023, now U.S. Pat. No. 11,939,945, which claims the benefit of U.S. Provisional Patent Application No. 63/383,873, filed Nov. 15, 2022, both of which are incorporated herein by reference in their entirety. This application is also related to U.S. patent application Ser. No. 18/468,586, filed Sep. 15, 2023, which is incorporated herein by reference in its entirety.

STATEMENT REGARDING FEDERALLY SPONSORED RESEARCH

This invention was made with Government support under Contract No. DE-SC0020821 awarded by the United States Department of Energy and under Contract No. 2133700 awarded by the National Science Foundation. The Government has certain rights in the invention.

TECHNICAL FIELD

Embodiments described herein generally relate to marine hydrokinetic technology, wave energy converter systems, and methods of making and using the same, and more specifically, to small-scale/non-grid tied adaptive point absorber and attenuator systems that intelligently adapt to enhance wave energy conversion.

BACKGROUND

There is an increased need for high-resolution sampling and prediction of ocean biogeochemistry with an emphasis on the carbon cycle. Increasingly, priorities such as these are being driven by the push for big data within oceanography. To enable better management of ocean resources and to generate new insights, additional power is required to collect more variables such as dissolved oxygen concentration measured using industry standard sensors (0.04-0.5 W, Seabird), sinking marine snow particle size and concentration measured with laser diffraction (1 mW, 670 nm solid state diode laser, Sequoia Scientific), ocean currents (5-50 W ADCP), ocean temperatures (0.5 W temperature sensors), the conductivity in the water column (0.5-3 W), communication devices (5 W-30 W) and to recharge AUVs or gliders that use to sample data in a much larger radius than the buoy itself.

Offshore marine sensors are currently powered by technologies such as solar panels, batteries, small-scale wind turbines, and diesel generators. However, each of these current power methodologies and devices falls short due to cost, maintenance requirements, reliability, and inadequate power duration, driving the need for innovation in power sources designed for ubiquitous marine use. Maintenance of incumbent methods require the commissioning of ships and specialized crews. Refueling for diesel generators can require commissioning ships frequently (every 3-10 months). Especially for marine sensors at remote locations, power interruptions can take several days to weeks to remediate.

Beyond maintenance costs, there exist other problems with the current power technologies. Solar panels and wind turbines are prone to intermittency and high seasonality. Batteries and diesel generators are vulnerable to cold temperature and the harsh ocean environment. In high latitudes such as the Arctic and Antarctic, low temperatures and very high variation in sunlight and wind make current energy solutions extremely expensive.

BRIEF DESCRIPTION OF THE DRAWINGS

Detailed descriptions of implementations of the present invention will be described and explained through the use of the accompanying drawings.

Figure 1:
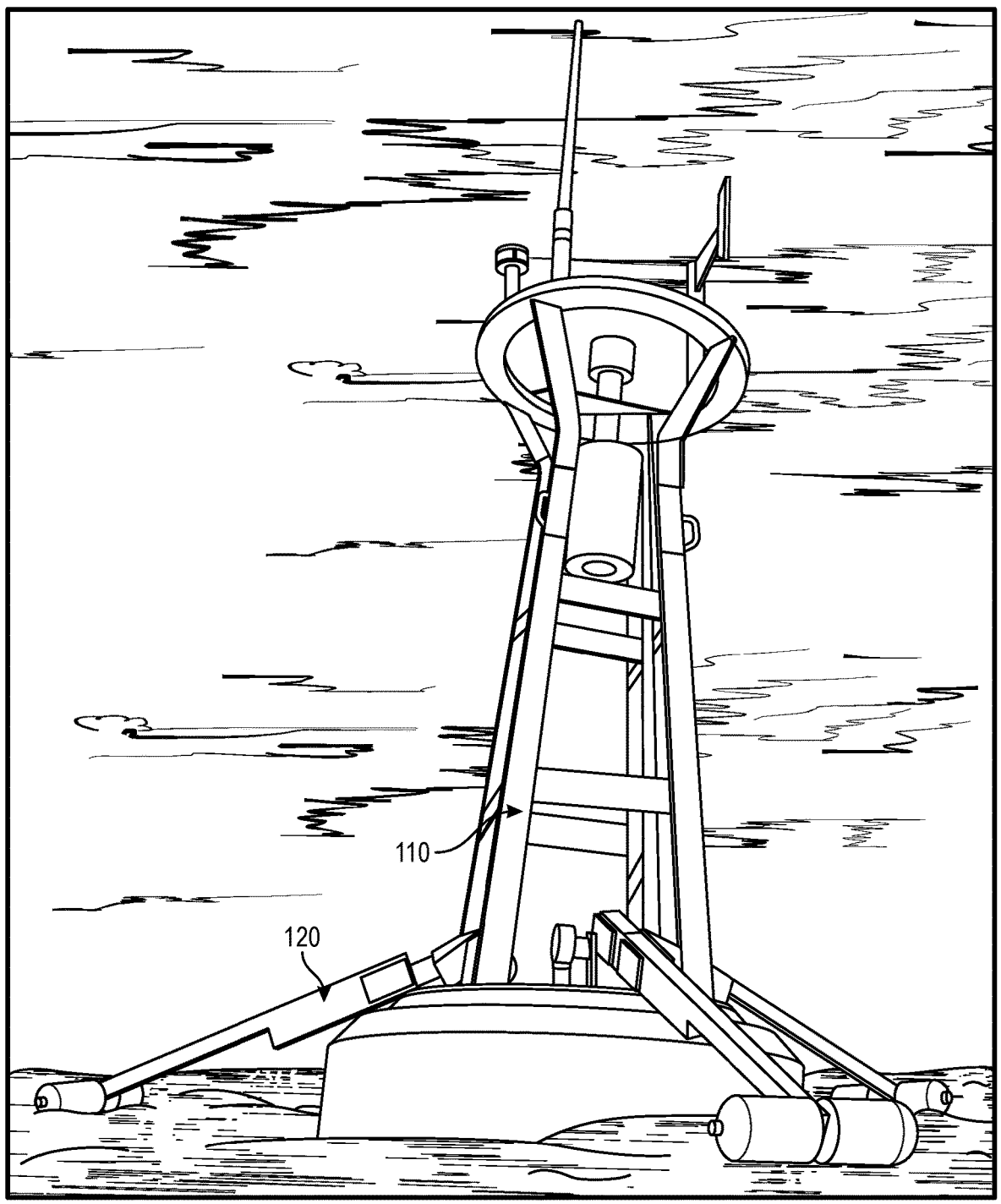
FIG. 1 illustrates an example environment in which a wave energy converter (WEC) operates.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Wave energy converter systems translate mechanical motion induced by waves into electrical energy. Such systems can serve as primary or supplemental power supplies to instruments or other devices on buoys, moorings, or other structures, or can recharge batteries used locally or remotely to power various electronic systems. Wave energy converters can provide reliable operation with minimized maintenance during prolonged use while maintaining optimized power generation. They can also be configured to adaptively respond to variable and unpredictable conditions to increase power output across a wide variety of wave conditions. As a result of these advantageous properties, substantially increased power generation and simultaneously lowered maintenance costs alleviate major obstacles in accelerating the blue economy and facilitating a big-data paradigm shift in the ocean. Methods and systems described herein can address several drawbacks of existing solutions for small-scale offshore power generation. These can include, for example, the design and use of a wave energy converter (WEC), adaptive power controls, physical configuration, and/or machine learning and/or artificial intelligence (AI) aided WEC that can adapt to ambient sea states.

According to some implementations, a wave energy capture system includes a plurality of arm assemblies, where each arm assembly includes a floatation device and an arm. The floatation device is configured to float on water. The arm is coupled to the floatation device at a first end of the arm and coupled to a pivot at a second end of the arm opposite the first end, and is couplable to a body via the pivot. The plurality of arm assemblies are configured to independently pivot around the pivots with respect to the body in response to movement of the floatation devices caused by waves in the water. The wave energy capture system further includes a mechanical energy capture system coupled to the plurality of arm assemblies. The mechanical energy capture system is configured to convert the independent pivoting of the plurality of arm assemblies around the pivots to electrical energy and to provide the electrical energy to an electronic device that is electrically coupled to the mechanical energy capture system to power the electronic device.

In some implementations, a wave energy capture system includes a plurality of arms that are each pivotably coupled to a mechanical body at a first end and a floatation device at a second end, where each of the floatation devices is configured to float on water and to cause a corresponding arm to pivot with respect to the mechanical body in response to waves in the water. The plurality of arms are capable of independent pivoting with respect to the mechanical body. The wave energy capture system can further include a mechanical energy capture system, coupled to the plurality of arms, that is configured to convert the independent pivoting of the plurality of arms to electrical energy.

In some implementations, a wave energy capture system includes a plurality of floatation devices that are each pivotably coupled to a mechanical body by a corresponding arm, where each of the floatation devices is configured to float on water and to cause the corresponding arm to pivot with respect to the mechanical body in response to waves in the water. The plurality of floatation devices are capable of independent movement with respect to the mechanical body. A mechanical energy capture system coupled to the plurality of floatation devices via the corresponding arms stores electrical energy based on the independent movement of the plurality of floatation devices.

Some implementations of a method for adaptive control of a wave energy capture system include: internal feedback from voltage and current generated, or receiving, at a controller of a wave energy capture system deployed in a body of water, input regarding real-time wave conditions in a vicinity of the wave energy capture system. A controller applies a control model to the received input to select a value of a control parameter for the wave energy capture system, where the control model includes a model that has been trained using machine learning to take wave condition data as input and to output control parameter values selected based on the wave condition data in order to increase an amount of energy captured by the wave energy capture system. The controller implements the selected value of the control parameter on the wave energy capture system.

A wave energy converter according to implementations herein is a modular, low-maintenance, non-grid tied, small-scale energy generation system that addresses many of the deficiencies of current power technologies for marine systems. The wave energy converter can be mounted to any of a variety of structures, including buoys, aquatic vessel, ports, docks, or any other structures floating on, anchored in, or adjacent to water. Additionally, adaptive control models that modify parameters of the wave energy converter, according to some implementations, can significantly increase the energy output of the system to operate more efficiently in dynamic wave conditions.

FIG. 1 illustrates an example environment in which a wave energy converter (WEC) operates. A buoy 110 deployed in a body of water can include sensing, data storage, and/or data transmission electronics. For example, a buoy can be deployed with electronic systems to measure ocean or weather conditions to obtain data relevant, for example, to global warming studies, ocean biosystem monitoring, pollution tracking, or any of a variety of other pursuits. Data collected by the buoy's electronic systems can be stored by the data storage devices on the buoy or can be transmitted to a remote location, such as a land- or ship-based computing device.

Mounted on the buoy 110 is at least one WEC 120. The WEC 120 converts mechanical motion induced by waves in the body of water to electrical energy to power the electronics on the buoy 110, either directly or via a battery. The WEC 120 can be a modular, low-maintenance, non-grid tied, small-scale energy generation system that addresses many of the deficiencies of current power technologies for marine systems. The WEC 120 also generates clean power based on a conversion of mechanical wave energy to electrical energy, thus reducing greenhouse gas emissions for powering the electronics on the buoy by obviating a need for fossil fuel-based energy.

The environment illustrated in FIG. 1 represents an example environment in which wave energy converters can operate and provide clean, low-maintenance energy to any electrically powered devices. Wave energy converters can be mounted to any of a variety of bodies in, on, or near water to convert mechanical wave energy to electrical power, which in turn can be either provided directly to an electronic device or stored in a battery.

Figure 2:
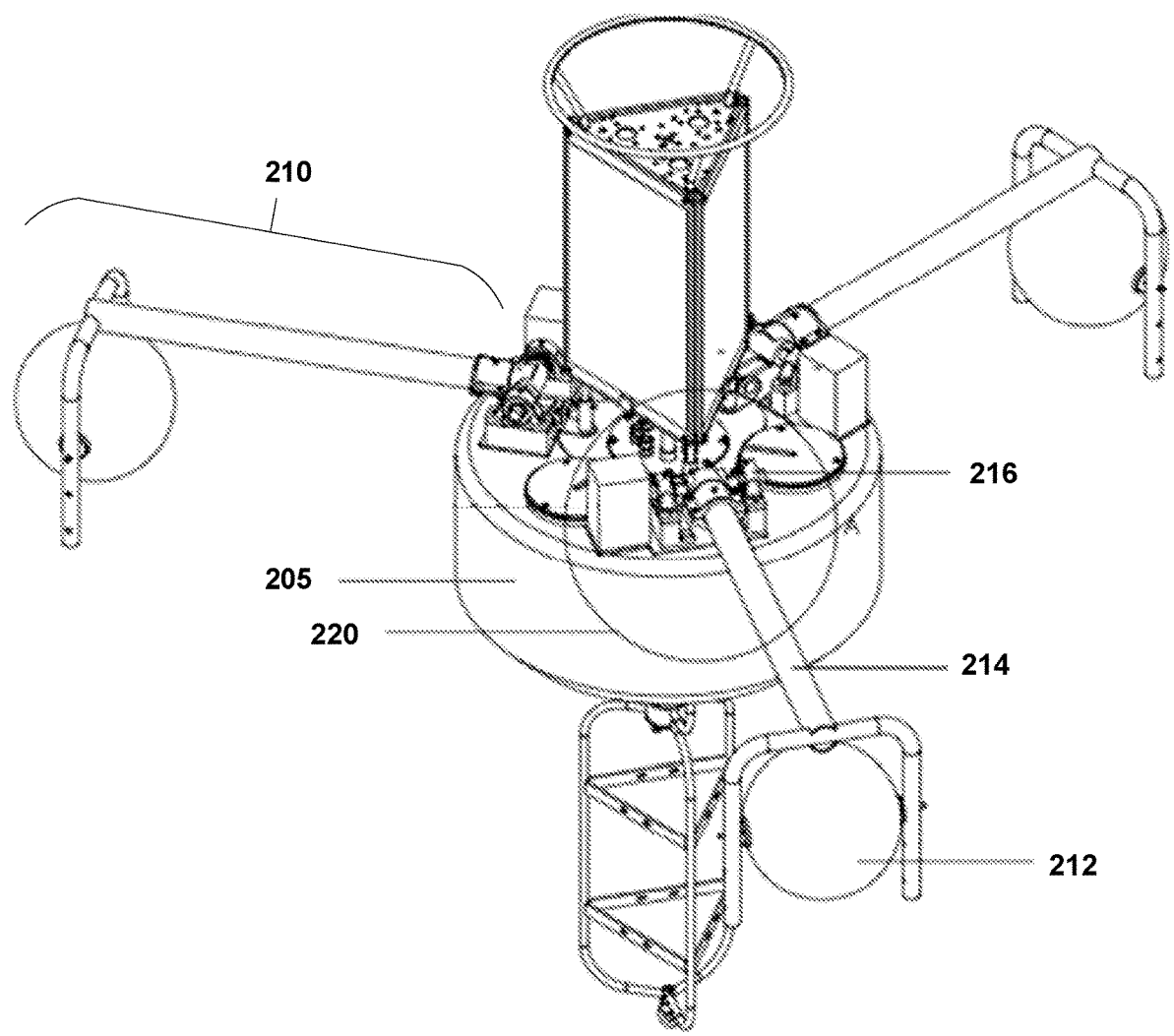
FIG. 2 is a schematic diagram of a wave energy converter, according to some implementations.

FIG. 2 is a schematic diagram of a WEC 120, according to some implementations.

As shown in FIG. 2, a WEC 120 can include one or more arm assemblies 210 and a mechanical energy capture system 220. The implementation of the WEC 120 illustrated in FIG. 2 is coupled to a buoy 205, though the WEC can have similar structures when coupled to other bodies.

Each arm assembly 210 includes a floatation device 212 and an arm 214. The floatation device 212 is configured to float on water and forces the arm 214 to move as waves reach, and pass under, the device 212. The floatation device 212 can include any object or material that floats on or is readily moved by water.

A first end of the arm 214 is coupled to the floatation device. A second end of the arm, opposite the first end, is coupled to a pivot 216. Some implementations of the arms 214 have a fixed length, or a fixed distance between the pivot 216 and the floatation device 212. This fixed length can be a length that is selected to maximize power output over a specified range of wave conditions, for example. However, in other implementations, a length of each arm 214 is adjustable (e.g., by an actuator in each arm). For example, lengths of the arms 214 can be adjusted or modified to have a length from about 50 cm to about 200 cm. The WEC 120 can include multiple arms 214 with the same length or with different lengths and/or a combination of adjustable and fixed arms.

The pivot 216 couples the arm 214 to a body, such as the buoy 205 or an aquatic vessel, port, dock, or other structure floating on, anchored in, or adjacent to the water. The pivot 216 can allow the arm 214 to move vertically with respect to the body, horizontally in parallel with a surface of the water on which the body is positioned, or in a multi-axis range of motion that includes both vertical and horizontal components.

The WEC 120 can include multiple arm assemblies 210 that can be distributed in various configurations relative to the body. For example, as illustrated in FIG. 2, the arm assemblies can be distributed radially around the buoy 205. For other types of bodies, such as a ship or a dock, the multiple arm assemblies can be disposed linearly along a side of the body. The arm assemblies can be distributed approximately evenly on or around the body or can be coupled to the body at unequal distances, for example to capture different wave mechanics at different locations of the body, to accommodate the shape of the body, or to avoid interference with other equipment attached to or near the body.

The multiple arm assemblies 210 of the WEC 120 are configured to independently pivot around the pivots 216 with respect to the body in response to movement of the floatation devices caused by waves in the water. Waves at the location of WEC devices are not always isotropic and may continually change their magnitude and direction. The ability for each arm assembly 210 to move independently allows the WEC 120 to capture wave energy more efficiently throughout all wave conditions. Furthermore, although the WEC 120 can include a single arm assembly 210, implementations of the WEC 120 that include multiple arm assemblies can be more reliable because other arm assemblies 210 may be able to continue generating power if one arm assembly fails. Thus, these implementations of the WEC 120 can facilitate continued operation of electronic systems even when the electronics are deployed at remote locations where repairs are difficult.

The mechanical energy capture system 220 is coupled to the arm assemblies 210 and is configured to generate electrical energy based on mechanical movement of the arm assemblies. The electrical energy can be used to power an electronic device that is electrically coupled to the mechanical energy capture system, either directly or via a battery. In various implementations, the mechanical energy capture system 220 can include one or more motors or generators to produce power as well as various mechanical components to translate movement of the arm assemblies 210 into torque on a motor or generator.

Figure 3:
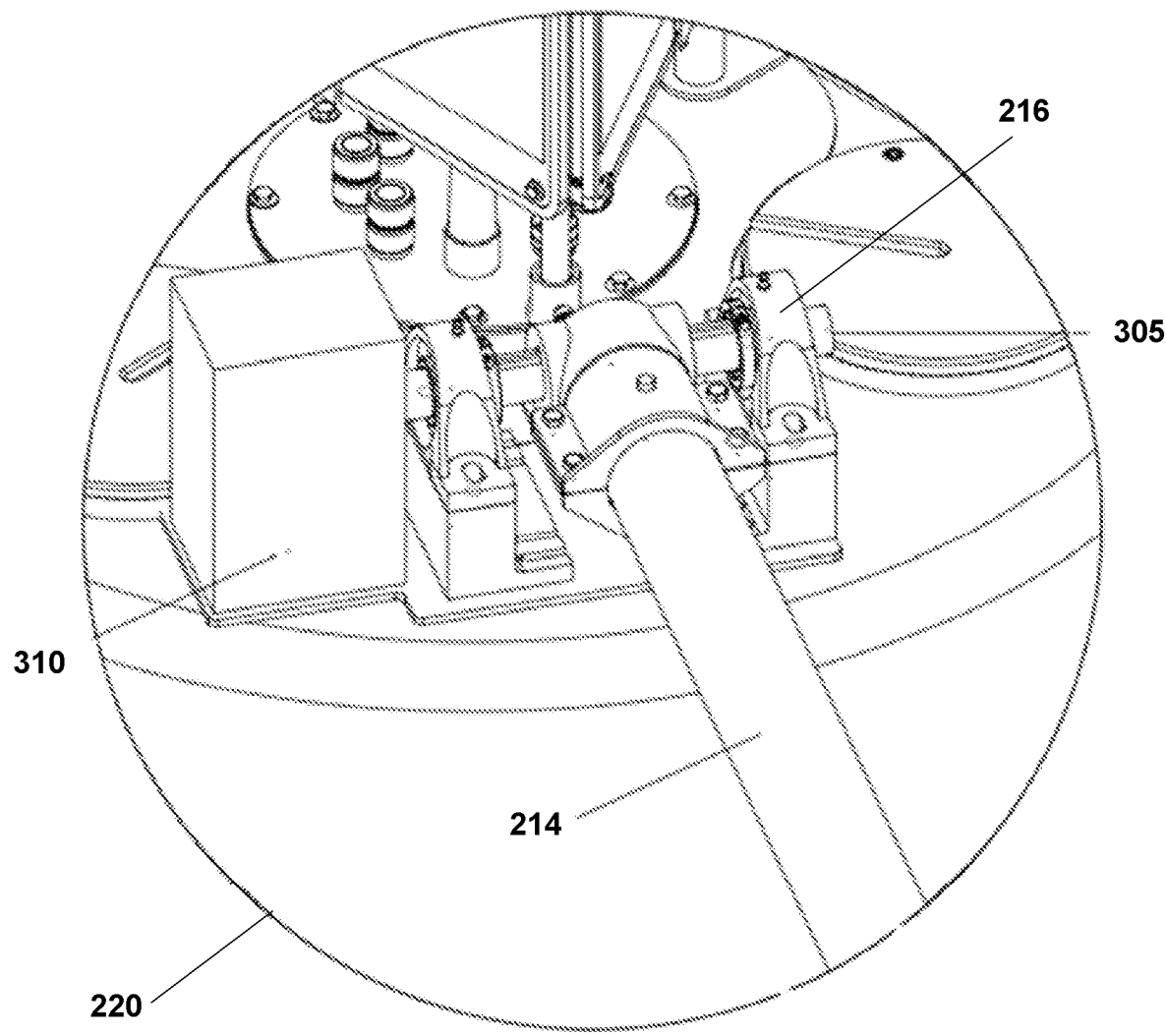
FIG. 3 illustrates a detailed view of a mechanical energy capture system, according to some implementations.

FIG. 3 illustrates a more detailed view of the mechanical energy capture system 220. As shown in FIG. 3, the arm 214 is configured to pivot around the pivot 216. The arm 214 is coupled to a shaft 305 that rotates relative to the pivot 216 as the arm 214 is caused to move by the floatation device 212. Rotation of the shaft 305 is translated into electrical energy by a generator 310. The shaft 305 can rotate bidirectionally in at least some implementations, for example as the arm 214 moves up and down in response to waves.

In some implementations, the mechanical energy capture system 220 includes an electrical generator 310 that uses rotational motion to generate an electric current. A gearbox can translate the mechanical motion of the arm assembly 210 around the pivot 216, which may be bidirectional motion, to unidirectional rotational motion. This unidirectional rotation motion can turn a coil in a magnetic field within the electrical generator, thus translating the mechanical motion caused by the waves into electric energy. Instead of or in addition to an electrical generator in which a coil turns within a magnetic field, the mechanical energy capture system 220 can include an electrical generator with a different configuration, a power take-off, a motor, or a combination of devices that generate electrical current in response to mechanical motion of the arm assembly 210. The gearbox can reduce size of a coupling between the arm assembly 210 and the generator 310 to facilitate use of the WEC 120 in space-limited applications. The gearbox can also provide gearing up or gearing down ratios between the arm 214 and the generator 310 in some implementations, for example to accommodate different amounts of torque applied by the arm 214 in different wave environments or for different sizes of arms 214, generators 310, or other components of the WEC 120.

Figure 4:
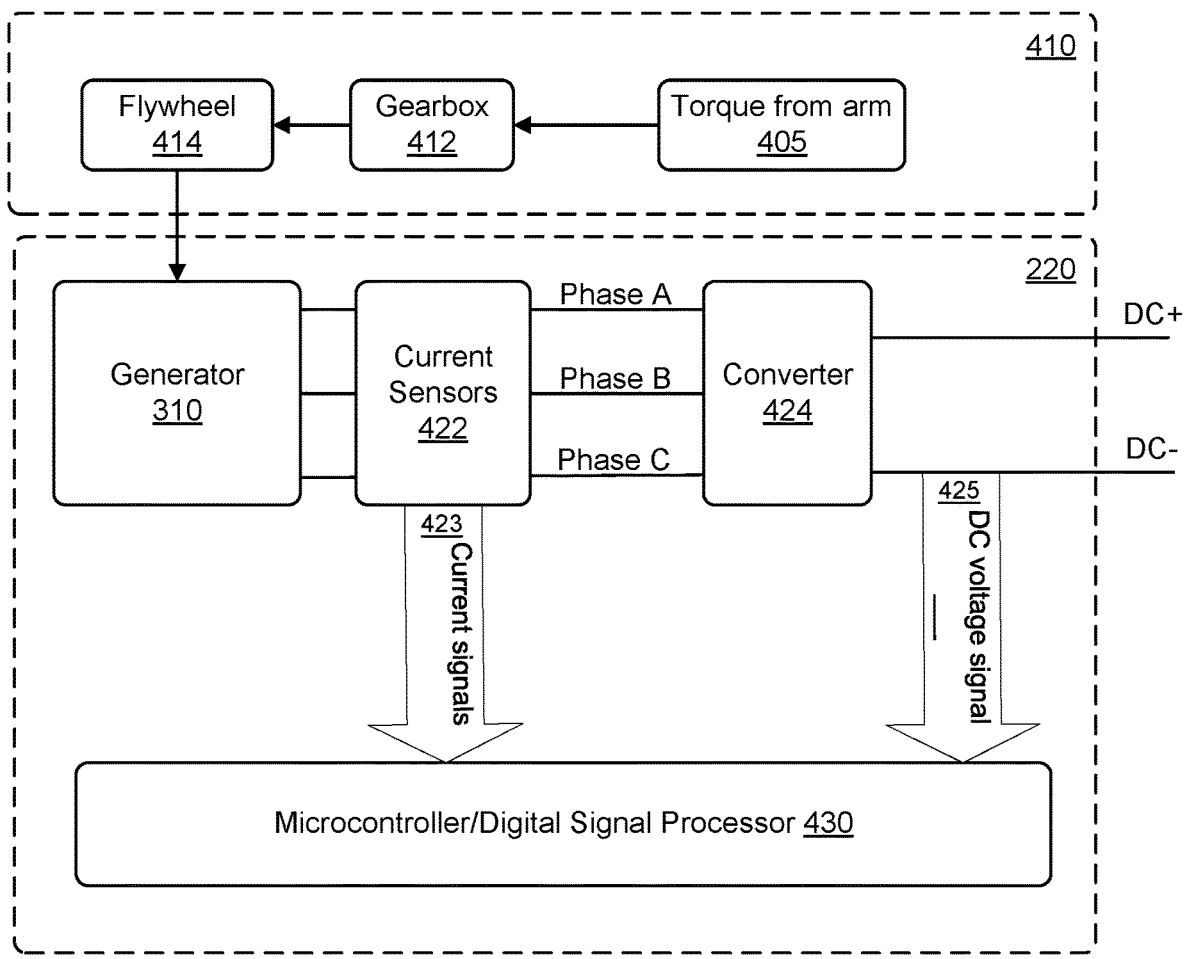
FIG. 4 depicts a block diagram of an implementation of a mechanical energy capture system.

Some implementations of the mechanical energy capture system 220 include a gearbox and a flywheel. FIG. 4 depicts a block diagram of an implementation of the mechanical energy capture system 220 in which a mechanical drive assembly 410, comprising a gearbox 412 and flywheel 414, is coupled to the generator 310. The arm 214 is coupled to the gearbox 412, for example via the shaft 305 shown in FIG. 3, such that motion of the arm 214 in response to waves applies torque 405 that is translated into turning gears within the gearbox 412. The gearbox 412 is in turn coupled to the flywheel 414, which is a rotational mass that smoothes rotational force between the arm 214, gearbox 412, and generator 310.

In FIG. 4, the generator 310 turns in response to the mechanical drive assembly 410, which generates a three-phase alternating electrical current. The generator 310 is coupled to current sensors 422 and a converter 424. The current sensors 422 monitor the three-phase electrical current output by the generator 310. The current sensors send the current signals 423 to a processing device 430 within the mechanical energy capture system 220, such as a microcontroller or digital signal processor. The converter 424 converts the AC electrical current to a DC current for output to an electrical device and/or a battery storage system. The converter also can send a DC voltage signal 425 to the processing device 430.

In some implementations, the output signal of the mechanical energy capture system 220 can be used to tune or adapt the electrical generator 310 and adjust torque, analogous to a gear change, in order to maximize electric current generation.

Systems Using Wave-Generated Power

Figure 5A:
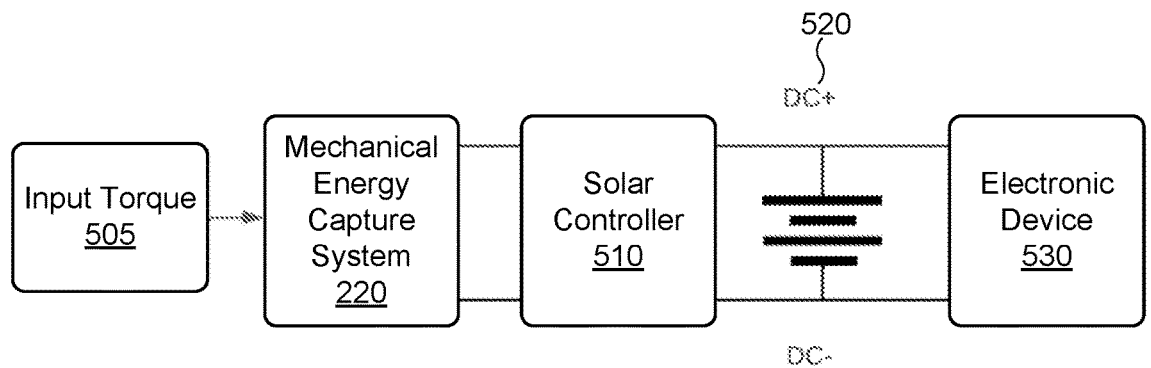
FIG. 5A shows a block diagram of an implementation in which a wave energy converter includes or is coupled to a solar controller.

In some implementations, the WEC 120 may be used in conjunction with a solar controller and a battery, where the solar controller selectively regulates power output to an electronic device from the WEC 120 and the battery. FIG. 5A shows a block diagram of an implementation in which the WEC 120 includes or is coupled to a solar controller 510. Electrical energy produced by the mechanical energy capture system 220 (e.g., based on input torque 505 from an arm assembly) is transmitted to the solar controller 510 that is configured to maintain the charge of a battery 520. An electronic device 530 or other power load is electrically coupled to the battery 520 such that the battery can supply power to the electronic device 530, for example when wave energy is low and the mechanical energy capture system 220 correspondingly produces insufficient power for the electronic device 530. As the electronic device 530 requires power, the battery 520 and/or the mechanical energy capture system 220 feed the electronic device 530 power. In some implementations, if the power produced by the mechanical energy capture system 220 is sufficient to maintain the battery float voltage, no power is drawn from the battery 520 and the electronic device 530 can be fed entirely by the mechanical energy capture system 220.

Figure 5B:
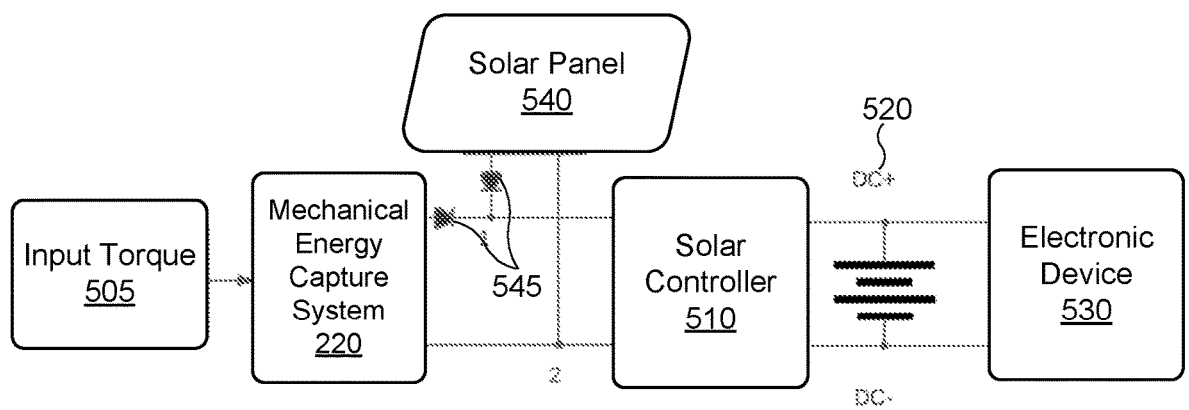
FIG. 5B shows a block diagram of an implementation of a system that includes both a wave energy converter and a solar panel.

A system that employs a WEC 120 to power one or more electronic devices can further include a solar panel to supplement the power production by the WEC 120. FIG. 5B shows a block diagram of an implementation of a system that includes both a WEC 120 and a solar panel 540 to provide electricity to the battery system 520 and to the electronic device 530. In this implementation, the solar controller 510 is electrically coupled to both the solar panel 540 and the mechanical energy capture system 220. The solar controller 510 maintains battery charge of the battery 520 using electrical energy output by the mechanical energy capture system 220 and the solar panel 540. Diodes 545 prevent current from moving from the mechanical energy capture system 220 to the solar panel 540 or vice-versa. As the electronic device 530 requires power, whichever of the power sources most capable of providing power at that moment does so. If any of the sources can provide enough power to maintain the battery float voltage at a given time, no power moves from the battery 520, and the electronic device 530 is fed entirely by the solar panel 540 and/or the mechanical energy capture system 220.

Figure 5C:
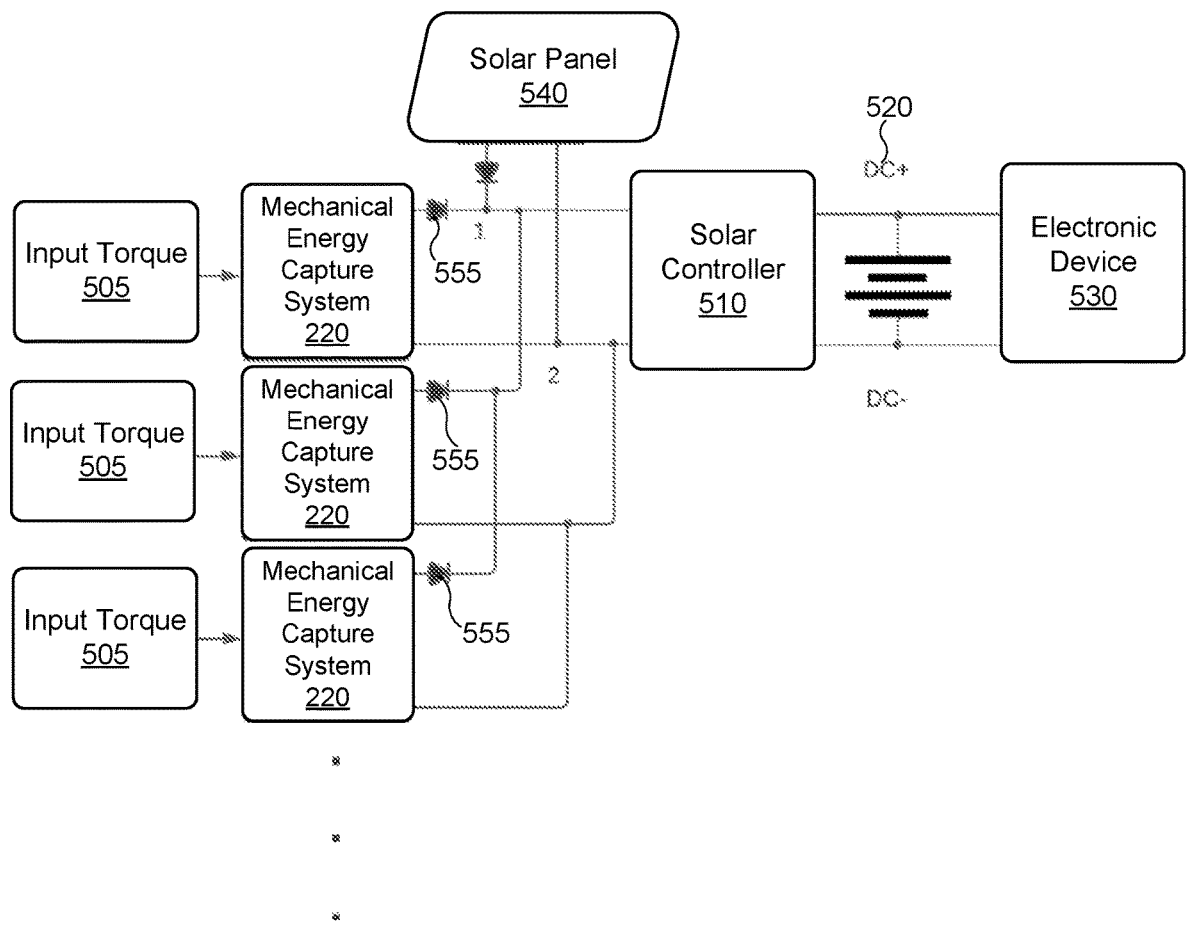
FIG. 5C shows a block diagram of an implementation of a system that includes multiple mechanical energy capture systems and a solar panel.

Some systems include multiple mechanical energy capture systems 220, with or without a solar panel 540 as illustrated in FIGS. 5A and 5B. FIG. 5C shows a block diagram of an implementation of a system that includes multiple mechanical energy capture systems 220 and a solar panel 540 to recharge a battery 520 and/or power an electronic device 530. FIG. 5C illustrates three mechanical energy capture systems 220 electrically coupled to the electronic device 530, though any number of mechanical energy capture systems 220 can be used. Each mechanical energy capture system 220 is coupled to the electronic device 530 via a diode 555 (e.g., to prevent backwards flow of current) and the solar controller 510. The solar controller 510 is further coupled to the solar panel 540 in the illustrated implementation. The solar controller 510 maintains battery charge with the power made available by the power generated by the mechanical energy capture systems 220 and the solar panel 540. As the electronic device 530 requires power, whichever of the power sources most capable of providing power at that moment does so. If any of the sources can provide enough power to maintain the battery float voltage at a given time, no power moves from the battery 520, and the electronic device 530 is powered entirely by the solar panel 540 and/or one or more of the mechanical energy capture systems 220.

Some implementations of the WEC 120 have an adaptive controller enabled by a machine learning model trained using reinforcement learning techniques to adjust power output of the WEC 120. Implementations of the controller can adjust features such as arm length or arm angle range of the arms 214; gear ratio, generator windings, and/or torque resistance of the mechanical energy capture system 220; and/or weight, buoyancy, center of gravity, or stability of motion of the floatation device 212. Adaptive control of the WEC 120 is described further below.

In some implementations, the WEC 120 uses drivetrain sensors to provide feedback to device controls and adaptability for power generation. These sensors may include but are not limited to one or more of: back EMF, hall effect, encoders, current sensors, torque sensors, strain gauges, voltage sensors, or any combination thereof. Some implementations of the WEC 120 use internal measurements and/or input to provide feedback to device controls and adaptability for power generation configuration. Parameters of various components of the WEC 120 can be adapted to modify power generation.

Some implementations of the WEC 120 use control sensor inputs to actuator output algorithms to provide feedback to device controls and adaptability for power generation. Such algorithms may include, for example: Maximum Power Point Tracking (MPPT), least mean squares, (linear, extended, unscented) kalman filters, covariance matrix variants, state machines with proportional, proportional-integral (PI), proportional-integral-derivative (PID) controllers, or any combination thereof. This may also include the use of artificial intelligence (AI) or machine learning (ML) such as, but not limited to convolutional neural networks, recurrent neural networks, ensembles, or deep learning neural networks which may be trained using reinforcement learning, supervised learning or some combination thereof.

Adaptive controls and maximum power point tracking algorithms can be used for increasing power generation, in some implementations. In a system where wave energy is translated to rotational energy of a generator and then into electrical energy, there will be an electrical torque applied to the motor that extracts maximum power from the waves. Analogues to this are the voltage maintained across the terminals of a solar panel and the speed of a windmill in a wind power system. In all three systems, the variable stated is one of the variables in the power equation.

$$\text{Solar Power: } P = IV$$

where $P$ = Power in Watts, $I$ = Current in Amps, $V$ = Voltage in Volts

Alternatively:

$$P = \omega T$$

where $P$ = Power in Watts, $\omega$ = rotational velocity in $\frac{\text{radians}}{\text{second}}$, $T$ = torque in Newton ∗ meters As one of the two variables in the power equation is altered (either current or voltage, or angular velocity or torque), the other variable reacts in the opposite direction. For example, as electrical torque is applied on the mechanical energy capture system 220, the angular velocity will decrease. Therefore, there will be an optimal level of these variables such that the product of them will be the maximum power that can be produced at a given time under the conditions existing at that time. Since the energy is being generated from variable sources such as solar irradiation or ocean waves of varying height and frequency, the maximum power level will change with time. This makes an adaptive control method like MPPT applicable to these types of power conversion systems.

A modified version of an MPPT algorithm can be implemented on the WEC 120 (e.g., by the solar controller 510, by the microcontroller 430, or by another control system).

For example, the WEC 120 is not grid connected, and thus there is a limit to the energy that can be absorbed. A battery can be coupled to the WEC 120 to make up for times of low wave energy. Lastly, because the WEC 120 produces power on a relatively small order of magnitude (e.g., on the order of 40 W per generator), losses in the generator, power electronics, and controller are of greater concern than under grid tie circumstances. Taking these considerations into account, the version of the MPPT algorithm implemented by the WEC 120 does not always seek to operate the WEC at maximum power.

For example, when the mechanical energy capture system 220 is maintaining the setpoint float voltage of the battery 520, the mechanical energy capture system 220 is providing all of the power that the system can absorb. If the controller increased the amount of power being produced by the mechanical energy capture system 220, the float voltage would increase and potentially damage components of the system. Thus, MPPT can be deactivated while the setpoint float voltage is maintained. On the other hand, when the mechanical energy capture system 220 is producing an amount of power that does not maintain the setpoint float voltage, MPPT can be employed to increase the power output from the mechanical energy capture system 220. When the MPPT algorithm is being implemented, the controller according to some implementations changes parameters of the WEC to perturb the angular velocity or torque applied to the mechanical energy capture system 220 and observes how these perturbations affect power output. The controller continues perturbing these variables in a direction that increases power until a stopping condition is met. Finally, the controller can be configured to shut off the WEC 120 when net usable power is negative. For example, under conditions where the generator is spinning but cannot generate enough power to even cover the losses in the system, a maximum power can be computed by the MPPT algorithm but operating the WEC 120 at that power would unnecessarily drain the battery. In this situation and in implementations in which the WEC 120 includes a flywheel, the controller can determine whether there is energy in the flywheel to cover the system losses, for example by setting a minimum flywheel speed of operation. If insufficient energy is available, one or more devices can be powered off or placed into a low-power operating mode until power can be obtained from the WEC 120 or solar sources.

MPPT can be implemented on the WEC 120 based on pairs of variables measured during operation of the WEC 120, such as DC link voltage and current (control voltage, measure current to maximize power), shaft speed and electrical torque (control torque, measure speed to maximize power), or direct/quadrature stator voltage and current. A hybrid approach to vary DC voltage to maximize shaft power can also be used.

Artificial Intelligence Models for Increasing Energy Capture

Given that the ocean can change dramatically, WECs according to various implementations herein can have high volatility in their energy output. Much of this volatility is attributable to the narrow range of device parameters for capturing energy: a WEC with parameters optimized for large wave conditions will capture less energy if waves are smaller and vice versa. In order to increase energy capture by the WEC under varying wave conditions, some implementations of the WEC 120 include a controller that employs a trained model to modify parameters of the WEC. Device parameters can be adjusted autonomously onboard the WEC 120 with artificial intelligence models trained on information provided from environmental input, sensors, or datasets. In these instances, the onboard AI dynamic control system can change device parameters so that the WEC 120 produces more power across a range of conditions of low to high wave frequency, low to high wave height, and low to high wave consistency.

Figure 6:
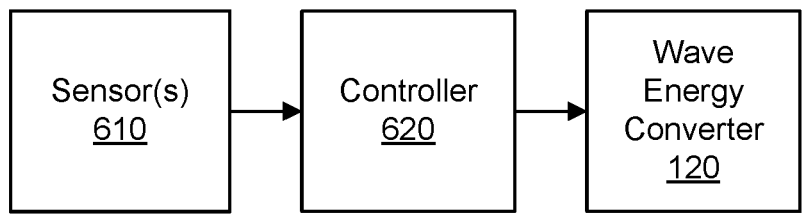
FIG. 6 is a high-level block diagram illustrating an implementation of a wave energy capture control system that adaptively controls parameters of a wave energy capture device.

FIG. 6 is a high-level block diagram illustrating an implementation of a wave energy capture control system 600 that adaptively controls parameters of a WEC 120. As shown in FIG. 6, the system 600 can include one or more sensors 610, a controller 620, and the WEC 120.

The one or more sensors 610 measure real-time wave conditions in a vicinity of the WEC 120 or parameters that may affect the real-time wave conditions. Sensors 610 can be attached to the WEC 120, mounted to the same body to which the WEC 120 is coupled, mounted to bodies near the body to which the WEC 120 is coupled, or otherwise placed in a position to measure wave conditions in the vicinity of the WEC. Example sensors include accelerometers, gyroscopes, magnetometers, cameras, electro-optical sensing systems, Radio Detection and Ranging (RADAR), Light Detection and Ranging (LIDAR), infrared (IR), Sound Navigation and Ranging (SONAR) (including any passive or active acoustic sensing device, such as an acoustic doppler current profiler, multibeam, forward look sonar, doppler velocity logger, or single beam), pressure sensors, or wind sensors such as propellors or vanes. The sensors 610 can additionally or alternatively include a sensor that is remote from the WEC's location but capable of measuring wave or weather conditions in the vicinity of the WEC, such as a satellite or a long-range camera mounted to a vessel or body remote from the WEC. The sensors can measure wave parameters such as wave height, wavelength, frequency, and/or amplitude. In some implementations, the sensors measure parameters that are not direct measurements of wave conditions, but that may be indicative of wave conditions in the vicinity of the WEC 120 currently or in the future. For example, some sensors can measure parameters that are indicative of current weather at the location of the WEC, weather systems that are moving toward or away from the WEC, or presence of boats or vessels passing by that may cause increased waves.

The sensors 610 are communicatively coupled to the controller 620 to transmit wave measurements to the controller 620. The controller 620 can include any of a variety of computing or processing devices that are capable of processing sensor inputs and producing control outputs. The controller 620 can employ one or more preconfigured rules, a model (such as a trained machine learning model or an analytical physics-based model), or a combination of one or more models and rules, to generate the control outputs based on sensor inputs. Examples of the controller 620 include a microcontroller platform or a single-board computer such as a Raspberry Pi or an NVIDIA Jetson. In at least some implementations, the controller 620 can include one or more processors and a memory or storage device to store sensor data and instructions that are executed by the one or more processors. The controller 620 executes a control model, which is a model that has been trained using machine learning to take wave condition data as input and to output control parameter values selected based on the wave condition data in order to increase an amount of energy captured by the wave energy capture system. Control parameters can include any parameter of the WEC 120 that is adjustable by the controller and that will change the amount of energy output by the WEC. Control parameter can include, for example, adjusting an arm length of one or more arms of the WEC or modifying a gear ratio of the gear assembly in the mechanical energy capture system 220.

The controller 620 implements the selected parameter values in the WEC 120. For example, if the selected parameter value is a different arm length than is currently implemented in an arm assembly of the WEC 120, the controller 620 sends a control signal to an actuator that adjusts the length of the arm assembly's arm to the selected length. Similarly, if the controller implements a different parameter for the gear ratio, a control signal is sent to a clutch to adjust the ratio, which allows for more speed and lower torque or less speed and higher torque. A control signal to a direct-drive motor or generator can likewise increase or decrease torque on the motor or generator.

As described above, the WEC 120 can include multiple arm assemblies and multiple mechanical energy capture systems. Accordingly, in some implementations, the controller 620 outputs the same parameter values for each of multiple components of the WEC 120 to be implemented in the WEC 120 at the same time. For example, the controller 620 uses the trained model to select an arm length and adjusts the length of the arm of each of multiple arm assemblies to the same selected arm length. In other implementations, the model employed by the controller 620 can be trained to select parameters for each component of the WEC 120 individually. For example, if multiple arm assemblies are arranged radially around a buoy, the arm assemblies may experience different wave characteristics because waves may not be isotropic. The controller 620 can thus use the trained model to select an arm length for each of the multiple arm assemblies and separately implement the selected arm lengths, such that the multiple arm assemblies have different arm lengths.

Adjustment to arm assemblies can be used to increase energy harvested or to promote short-term dynamic instability which could amplify motion in the device body analogous to finding a resonance frequency between the changing waves and the device body. In low wave environments, optimal power generation may be available by exploiting the resonance of the device body and arm compared to the waves directly. For example, this may be used given an arbitrary orientation of the device body with respect to the waves, such as arms along a wave axis having different lengths than arms perpendicular to the wave axis. In another example, the controller 620 adjusts torque on the mechanical energy capture system to different levels for different arm assemblies by configuring a first gear ratio between a first arm assembly and the mechanical energy capture system and a second, different gear ratio between a second arm assembly and the mechanical energy capture system. By modifying the arm lengths and/or gear ratios, a resonance of instability motion can be established that increases the amount of motion that can be translated into electrical energy by the mechanical energy capture system, especially under low-wave conditions. Accordingly, in some implementations, the controller 620 generates a first control signal to drive a first actuator associated with a first arm to set a first length for the first arm, while also generating a second control signal to drive a second actuator associated with a second arm to set a second length for the second arm.

Figure 7:
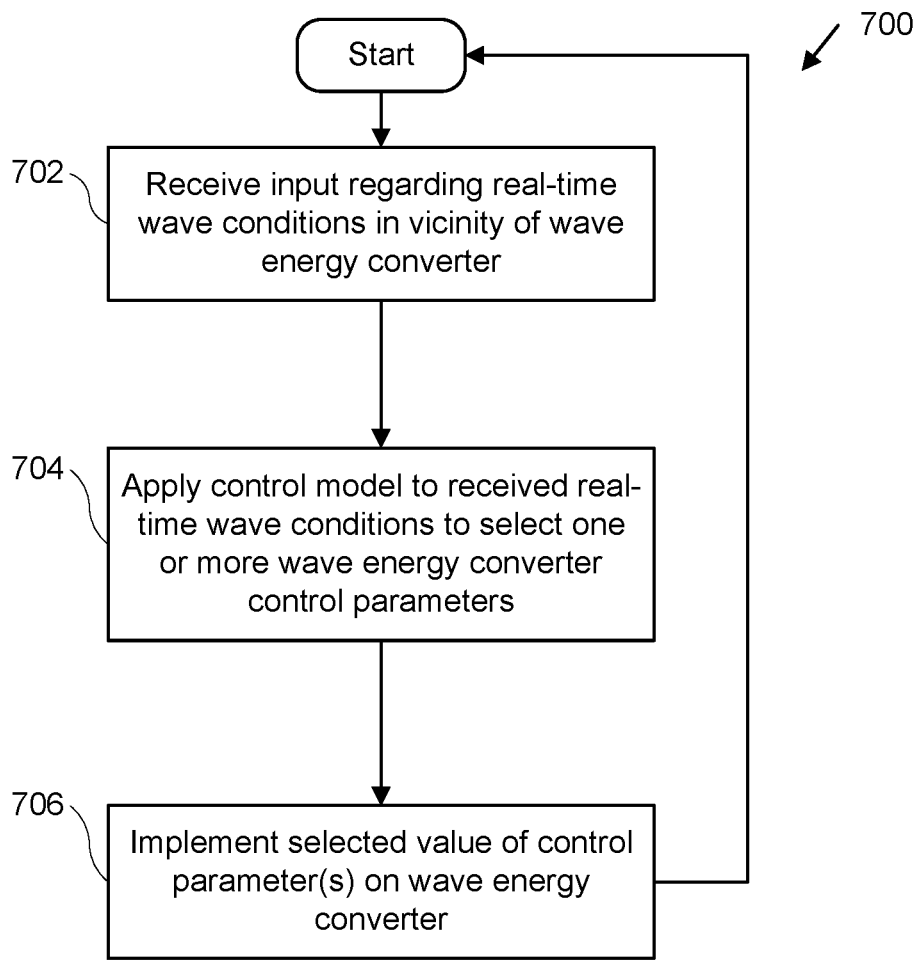
FIG. 7 is a flowchart illustrating a process for adaptively controlling power output from a wave energy capture system, according to some implementations.

FIG. 7 is a flowchart illustrating a process 700 for adaptively controlling power output from a wave energy capture system, such as the WEC 120, according to some implementations. The process 700 can be performed by a controller communicatively coupled to the WEC.

At 702, the controller receives input regarding real-time wave conditions in a vicinity of the WEC. The real-time wave conditions can be received from one or more sensors placed on or near the WEC, and include, for example, measurements of wave height, wave frequency, wave wavelength, or wave amplitude.

At 704, the controller applies a control model to the received real-time wave condition input to select a value of a control parameter for the WEC. The control model is a model that has been trained using machine learning to take wave condition data as input and to output control parameter values selected based on the wave condition data in order to increase an amount of energy captured by the wave energy capture system.

At 706, the controller implements the selected value of the control parameter on the WEC. For example, the controller generates a signal that drives an actuator to change a length of one or more arms of the WEC, to change an angle between an arm and a body to which the WEC is coupled, or to change the gear ratio of the mechanical energy capture system.

In some implementations, the control model can be fine-tuned by the controller of the WEC in situ based on historical data captured during operation of the WEC. For example, the controller measures actual energy output from the WEC, as well as wave conditions and device parameters at the time of the measured energy output. The controller uses these values to periodically retrain the control model in order to improve the ability of the control model to accurately predict the optimal device parameters from the particular WEC on which it is deployed under the varying wave conditions that exist at the location of the WEC.

Training an Adaptive Wave Energy Control Model

In some implementations, the model employed by the controller 620 to select WEC parameters is trained in situ by the controller, based on wave measurements at the WEC and measurements of energy output of the WEC under different wave conditions. The model can be alternatively trained offline, remote from the WEC by training a simulation model. The simulation model uses datasets of historical wave data and device parameters to train a control model offline. Training a control model offline using a simulation model provides simpler and less risky opportunities for machine learning than deploying training hardware on a live device at sea. In some implementations, model training includes first training a wave simulator to predict an amount of energy that will be produced by a wave energy converter under various conditions. Once the simulator has been trained using supervised learning, the simulator can be used to train the control model using reinforcement learning that will select parameters of the WEC in order to increase its energy output under various conditions.

Figure 8:
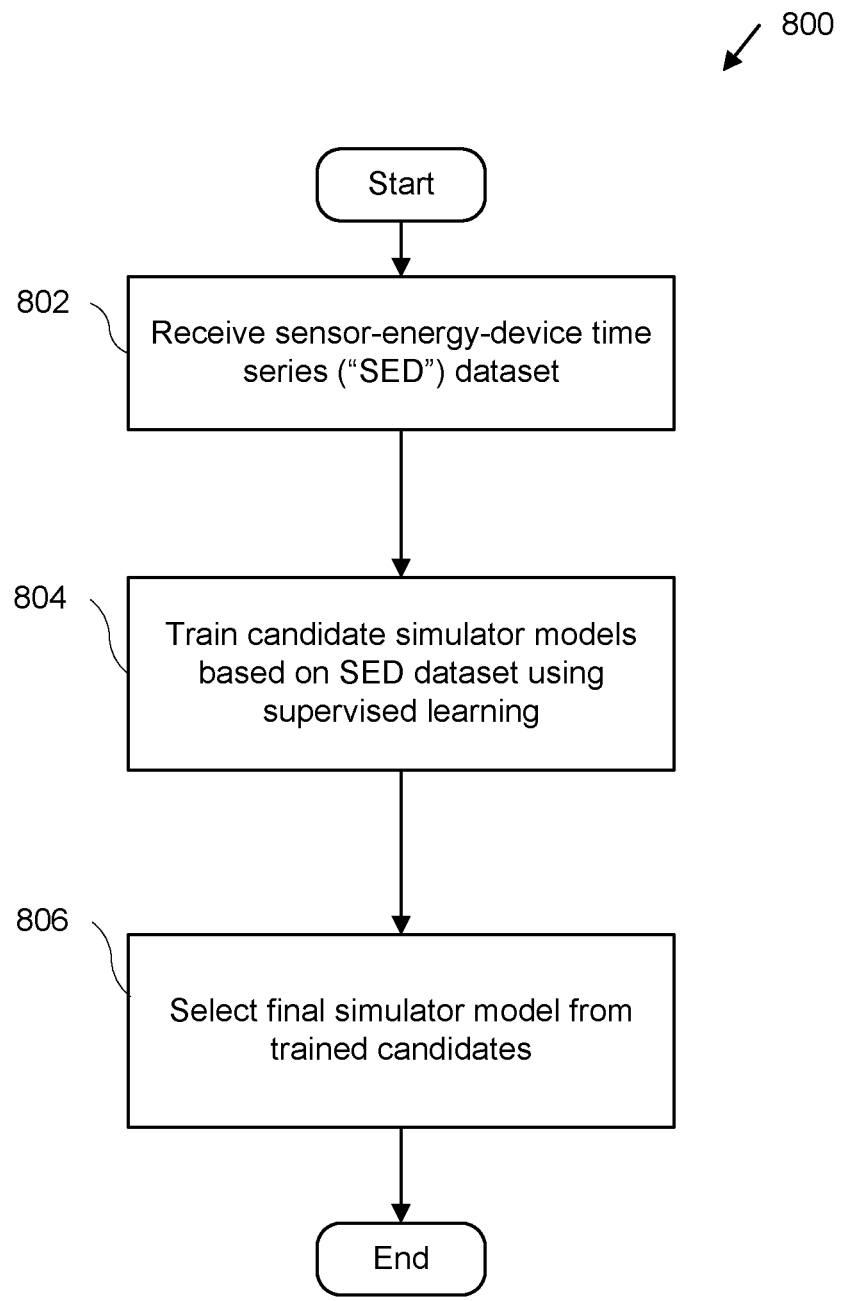
FIG. 8 is a diagram illustrating a process for training a wave simulator model, according to some implementations.

FIG. 8 is a diagram illustrating a process 800 for training a wave simulator model, according to some implementations. The process 800 can be performed offline by a computing device remote from the WEC 120, such as a personal computer or one or more server instances.

At 802, the computing device receives a sensor-energy-device time series ("SED") dataset, which can be a multivariate time series where each timestep contains one or more sensor readings, a record of the WEC device parameters at that time step, and an energy output produced by the WEC 120. The SED dataset can be obtained by a controller coupled to one or more test WECs deployed in a body of water. For example, the controller can use off-the-shelf Internet of Things hardware (e.g. a Raspberry Pi III). The controller causes device parameters of the test WEC to vary randomly. At short intervals, a logging mechanism of the controller records reading(s) from the sensor(s), the device parameters, and the energy output of the WEC. In addition to receiving the SED dataset, the computing device can receive fixed device parameter datasets ('FDP datasets'), for example assist in evaluation and benchmarking as the simulation model is trained. The FDP datasets can be generated by deploying a test WEC with fixed device parameters that do not change, such as a fixed arm length and gear ratio. For example, FDP datasets can be generated by measuring sensor readings and energy production by a test WEC when the parameters of the test WEC are fixed at each of the following parameter values:

1) the lowest gear ratio and arm length for the test WEC;
2) the middle gear ratio and arm length; and
3) the highest gear ratio and arm length.

At 804, the computing device trains candidate simulator models based on the SED dataset. Training can be performed by supervised machine learning techniques, in which one or more time steps are sampled from the SED and output energy at each time step is predicted. Multiple candidate simulator models (e.g., 800) can be trained. For each candidate simulator model, a set of parameters are chosen for: 1) the number of time steps, 2) the stride between time steps, 3) other hyperparameters for the machine learning algorithm used to train the candidate simulator model (e.g., tree depth if using a decision tree or random forest). The candidate simulator model is trained to predict the output energy on the last timestep, given this sample. The type of model that is trained can be selected based on the type of sensor data that will be available to an adaptive controller deployed on a WEC 120. For example, if sensor readings generate images, point clouds (e.g., Radio Detection and Ranging (RADAR), Light Detection and Ranging (LIDAR), infrared (IR), Sound Navigation and Ranging (SONAR), ADCP, IMU, cameras/vision, or even separate sentinel buoys that exist just to send data back to the main buoy), or other high dimensional representations at each time step, a neural network that uses convolutional layers or dynamic graph convolutional neural network can be trained as the candidate simulator model. Since the depth of the neural network will vary depending on the sensors, the depth can be a hyperparameter that is discovered during the simulator model training procedure. If no such high dimensional data is used, a random forest or extreme gradient boosted forest can be used as the architecture for the candidate simulator model. If a random forest or extreme gradient boosted forest is used, the number of estimators ("trees") and the depth of the trees are hyperparameters that are selected during training. While it is possible to randomly select values (i.e., "random search") for stride, model size, time steps, and other hyperparameters or to train candidate simulator models for all possible combinations of them (i.e., "grid search"), some implementations of the computing device use an estimator to learn the best values for these hyperparameters under the conditions in which the candidate simulator models are trained. For example, a Tree-Structured Parzen Estimator can be used to learn from each subsequent training event of a candidate simulator model.

A "model," as used herein, can refer to a construct that is trained using training data to make predictions or provide probabilities for new data items, whether or not the new data items were included in the training data. For example, training data for supervised learning can include items with various WEC parameters and various wave parameters, together with a measured energy output. A new data item can have parameters that a model can use to predict energy output from the WEC given the parameters of the new data item. As another example, a model can be a probability distribution resulting from the analysis of training data, such as a likelihood of producing a certain amount of energy output based on an analysis of the input wave conditions and WEC parameters. Examples of models include neural networks, support vector machines, decision trees, Parzen windows, Bayesian models, clustering using techniques such as K-means, probability distributions, decision trees, decision tree forests, ensembles of models, and others. Models can be configured for various situations, data types, sources, and output formats.

In some implementations, the simulator model can be a neural network with multiple input nodes that receive wave parameters and WEC parameters as inputs. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as a prediction of the energy output from the WEC. In some implementations, such neural networks can have multiple layers of intermediate nodes with different configurations, can be a combination of models that receive different parts of the input and/or input from other parts of the neural network, or are convolutions—partially using output from previous iterations of applying the model as further input to produce results for the current input.

A simulator model can be trained with supervised learning, where the training data includes the WEC parameters and wave conditions as input and a desired output, such as the actual energy produced by the WEC under the input conditions. Output from the simulator model (a predicted amount of energy) can be compared to the desired output for the input conditions and, based on the comparison, the model can be modified, such as by changing weights between nodes of the neural network or parameters of the functions used at each node in the neural network (e.g., applying a loss function). After applying each of the sets of WEC parameters, wave conditions, and energy output in the training data and modifying the model in this manner, the model can be trained to evaluate new pairs of WEC parameters and wave conditions to predict a corresponding energy output.

At 806, the computing device selects one of the trained candidate simulator models as a final simulator model. The final simulator model can be selected, for example, as the candidate model that is able to most closely approximate net energy output by a WEC given previous time steps.

Figure 9:
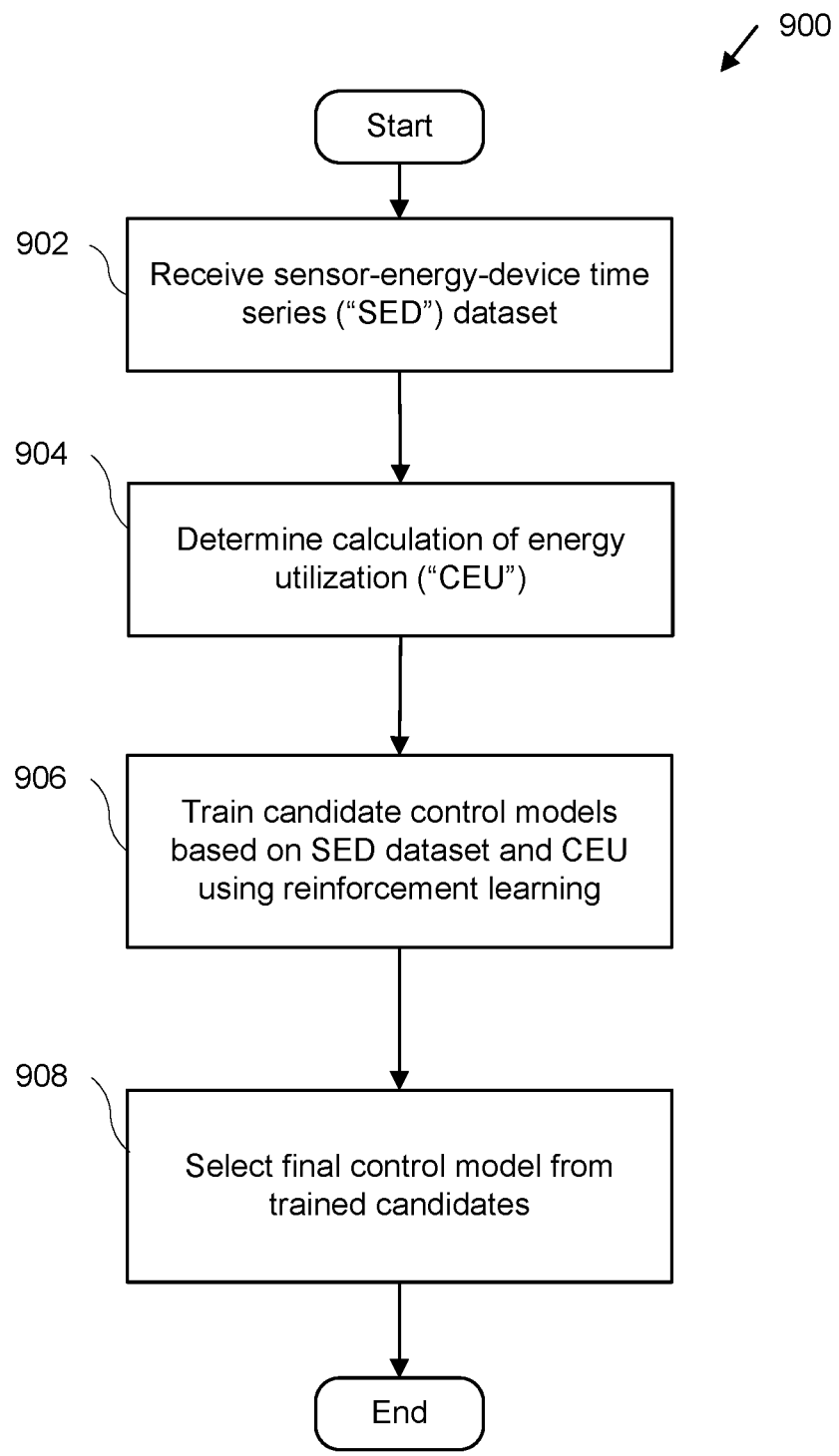
FIG. 9 is a flowchart illustrating a process for training a control model based on the simulator model, according to some implementations.

Once a final simulator model has been obtained, the simulator model can be used to train a control model. FIG. 9 is a flowchart illustrating a process 900 for training a control model based on the simulator model, according to some implementations. Like the simulation model training process 800, the control model training process 900 can be performed offline by a computing device remote from the WEC 120.

At 902, the computing device receives an SED dataset with historical sensor readings and device parameters. The SED dataset used for control model training can be the same dataset used for the simulator model training or a different dataset obtained in a similar way.

At 904, the computing device determines a calculation of energy utilization ("CEU") that estimates the total energy used by the control model. Specifically, the CEU may estimate the amount of energy required to change the WEC parameters given their current state using a simple physics-based model. It may then add a constant cost to power the device to take a single measurement. Finally, the CEU will add the amount of energy required to execute a single prediction on a model deployed on an IoT device (e.g., a Raspberry Pi) given the number of model parameters. In some embodiments, the CEU may be built using simple tests on WEC hardware.

At 906, the computing device trains candidate control models based on the SED dataset and the determined CEU. Like the candidate simulator models, multiple candidate control models can be trained by selecting hyperparameters for: 1) the number of time steps, 2) the stride between time steps, (3) the amount of time to wait between subsequent samples, and 4) other hyperparameters for the machine learning algorithm used to train the candidate control model (e.g., tree depth if using a decision tree or random forest). Control model candidates are trained using reinforcement learning. While training, control model candidates are given control model inputs and requested to output a decision for each WEC parameter setting. The simulator model inputs (e.g., measurements of wave conditions) and the WEC parameter decision are given to the simulator model, which then produces a prediction for the total energy output. The total energy output is used as the reward to update the candidate control model. If there is more than one simulator model input for a given control model input, the multiple predictions of the simulator model can be normalized over time, for example by computing an average of the multiple predictions.

Since the control model is intended to be deployed on a WEC at sea, there may be power constraints that limit the usability of the model when deployed. Accordingly, some implementations of the computing device take CEU into account while training the model to account for energy costs such as the costs incurred when capturing a sensor measurement, storing the sensor data, processing the sensor data using the control model, generating commands that implement parameter selections on the WEC, or other operational energy costs. For example, the energy output predicted by the simulator model can be penalized by the CEU (e.g., by subtracting the energy cost of running the sensors and candidate control model from the predicted energy output), resulting in a computed reward value for the candidate control model. This reward value is used to update the candidate control model.

At 908, the computing device selects one of the candidate control models as a final model to implement on a WEC. For example, the computing device selects a candidate control model that maximizes the reward at each time step, taking into account predicted energy output and CEU.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:
receiving, at a controller of a wave energy capture system deployed in a body of water, input regarding real-time wave conditions in a vicinity of the wave energy capture system;
wherein the wave energy capture system comprises an adjustable-length arm coupled to a main body;
applying, by the controller, a control model to the received input to select a control parameter value for the wave energy capture system,
wherein the control model comprises a model that has been trained using machine learning to take wave condition data as input and to output control parameter values selected based on the wave condition data in order to increase an amount of energy captured by the wave energy capture system; and
wherein applying the control model to select the value of the control parameter for the wave energy capture system comprises:
selecting an arm length for the adjustable-length arm; or
selecting a resting angle between the adjustable-length arm, waterline of the body of water at rest, and the main body; and
implementing, by the controller, the selected value of the control parameter on a physical, electrical, or software configuration of the wave energy capture system.

2. The method of claim 1, wherein the input regarding real-time wave conditions comprises direct or indirect measurements of wave height, wave speed, wave direction, wave frequency, wave wavelength, or wave amplitude.

3. The method of claim 1, wherein the control model is trained offline by a computing system based on a wave simulator model that is configured to predict an amount of electrical energy that will be produced by the wave energy capture system given simulated wave conditions.

4. The method of claim 3, wherein the computing system is configured to train the control model by:
obtaining a training dataset including historical wave condition measurements, parameters of the wave energy capture system, and amounts of electrical energy produced by the wave energy capture system corresponding to the historical wave condition measurements and the parameters of the wave energy capture system;
determining a calculation of energy utilization that estimates total energy used by the control model;
causing the wave simulator model to output, for each of a plurality of samples of the training dataset, a predicted amount of electrical energy to be produced by the wave energy capture system under wave conditions and wave energy capture system parameters corresponding to each sample; and
training the control model based on the predicted amount of electrical energy being penalized by the calculation of energy utilization.

5. The method of claim 1, further comprising:
storing, by the controller, historical data including measurements of wave conditions, parameters of the wave energy capture system, and amounts of electrical energy produced by the wave energy capture system corresponding to the wave condition measurements and the parameters of the wave energy capture system; and
retraining the control model, by the controller, based on the stored historical data.

6. The method of claim 1, wherein the wave energy capture system comprises:
a floatation device pivotably coupled to a main body via an arm; and
a mechanical energy capture system coupled to the floatation device via a gear assembly;
wherein applying the control model to select the value of the control parameter for the wave energy capture system comprises selecting a gear ratio for the gear assembly through a clutch device at a joint of the arm and the main body.

7. The method of claim 1, wherein the wave energy capture system comprises a floatation device coupled to a main body via an arm, wherein the floatation device has an adjustable buoyancy, and wherein applying the control model to select the value of the control parameter for the wave energy capture system comprises:
increasing or decreasing the buoyancy of the floatation device.

8. The method of claim 1, wherein the wave energy capture system comprises an adjustable center of gravity, and wherein applying the control model to select the value of the control parameter for the wave energy capture system comprises:
modifying the center of gravity of the wave energy capture system.

9. The method of claim 1, wherein the wave energy capture system comprises:
a floatation device pivotably coupled to a main body;
a mechanical energy capture system, coupled to the floatation device via a gear assembly, the mechanical energy capture system configured to convert mechanical motion of the floatation device relative to the main body to electrical energy; and
a battery electrically coupled to the mechanical energy capture system and configured to store the electrical energy output by the mechanical energy capture system;
wherein the controller reduces greenhouse gas emissions for recharging the battery by causing the mechanical energy capture system to passively convert mechanical wave energy to electrical energy.

10. A system comprising:
a processor; and a non-transitory computer-readable medium storing instructions that, when executed by the processor, cause the system to:
receive input regarding real-time wave conditions in a vicinity of a wave energy capture system deployed in a body of water;
wherein the wave energy capture system comprises:
a floatation device pivotably coupled to a main body via an arm; and
a mechanical energy capture system coupled to the floatation device via a gear assembly;
apply a control model to the received input to select a configuration for the wave energy capture system,
wherein the control model comprises a model that has been trained using machine learning to take wave condition data as input and to output configuration commands selected based on the wave condition data in order to increase an amount of energy captured by the wave energy capture system; and
wherein applying the control model to select the configuration for the wave energy capture system comprises selecting a gear ratio of the gear assembly through a clutch device at a joint of the arm and the main body;
control the wave energy capture system by issuing one or more of the configuration commands to change kinematic energy capture motion by the wave energy capture system.

11. The system of claim 10, wherein the instructions when executed by the processor further cause the system to:
store historical data including measurements of wave conditions, parameters of the wave energy capture system, and amounts of electrical energy produced by the wave energy capture system corresponding to the wave condition measurements and the configuration of the wave energy capture system; and
retraining the control model based on the stored historical data.

12. The system of claim 10, wherein the wave energy capture system comprises an adjustable-length arm coupled to a main body, and wherein applying the control model to select the configuration for the wave energy capture system comprises:
selecting an arm length for the adjustable-length arm; or
selecting a resting angle between the adjustable-length arm, ocean waterline at rest, and the main body.

13. The system of claim 10, wherein the wave energy capture system comprises a floatation device coupled to a main body via an arm, wherein the floatation device has an adjustable buoyancy, and wherein applying the control model to select the configuration for the wave energy capture system comprises:
increasing or decreasing the buoyancy of the floatation device.

14. The system of claim 10, wherein the wave energy capture system comprises an adjustable center of gravity, and wherein applying the control model to select the configuration for the wave energy capture system comprises:
modifying the center of gravity of the wave energy capture system.

15. A non-transitory, computer-readable storage medium storing instructions that, when executed by a processor of a system, cause the system to:
receive input regarding real-time wave conditions in a vicinity of a wave energy capture system deployed in a body of water;
wherein the wave energy capture system comprises an adjustable-length arm coupled to a main body;
apply a control model to the received input to select a value of a control parameter for the wave energy capture system,
wherein the control model comprises a model that has been trained using machine learning to take wave condition data or one or more current control parameters as input and to output control parameter values selected based on the wave condition data in order to increase an amount of energy captured by the wave energy capture system; and
wherein applying the control model to select the value of the control parameter for the wave energy capture system comprises:
selecting an arm length for the adjustable-length arm; or
selecting a resting angle between the adjustable-length arm, waterline of the body of water at rest, and the main body; and
control the wave energy capture system by implementing one or more of the control parameter values on the wave energy capture system.

16. The non-transitory computer-readable storage medium of claim 15, wherein the wave energy capture system comprises:
a floatation device pivotably coupled to a main body via an arm; and
a mechanical energy capture system coupled to the floatation device via a gear assembly;
wherein applying the control model to select the value of the control parameter for the wave energy capture system comprises selecting a gear ratio of the gear assembly through a clutch device at a joint between the arm and main body.

17. The non-transitory computer-readable storage medium of claim 15, wherein the wave energy capture system comprises a floatation device coupled to a main body via an arm, wherein the floatation device has an adjustable buoyancy, and wherein applying the control model to select the value of the control parameter for the wave energy capture system comprises:
increasing or decreasing the buoyancy of the floatation device.

* * * * *